Nov. 17, 1959    N. W. SCHUBRING    2,912,854
ULTRASONIC SURFACE TESTING DEVICE
Filed May 27, 1955

INVENTOR
Norman W. Schubring
BY
R. E. Fowler
ATTORNEY

2,912,854

ULTRASONIC SURFACE TESTING DEVICE

Norman W. Schubring, Hazel Park, Mich., assignor to General Motors Corporation, Detroit, Mich., a corporation of Delaware Application May 27, 1955, Serial No. 511,556

4 Claims. (Cl. 73—67.7)

This invention relates to nondestructive inspection and testing means and more particularly to inspection and testing means utilizing a beam of high frequency waves to locate flaws, cracks or seams in parts.

In production parts flaws, cracks or other irregularities lie on or very near the surface, but are of such small size that they are difficult if not impossible to detect by visual inspection. These defects may cause failure of the part in service and expensive repair.

It is therefore an object in making this invention to provide nondestructive inspection means that will detect and indicate the location of surface or slightly sub-surface faults.

It is a further object in making this invention to provide an ultrasonic testing means for producing surface waves in a part to locate flaws.

It is a still further object in making this invention to provide transmitting and detecting means utilizing surface waves in a part for the location of flaws.

It is a still further object in making this invention to provide a vibration transmitting member supporting both a transmitting and detecting means for application to the surface of a part to be tested to induce surface waves into and receive reflected surface waves from the part for inspection purposes.

With these and other objects in view which will become apparent as the specification proceeds, my invention will be best understood by reference to the following specification and claims and the illustrations in the accompanying drawings, in which:

Figures 1, 2:
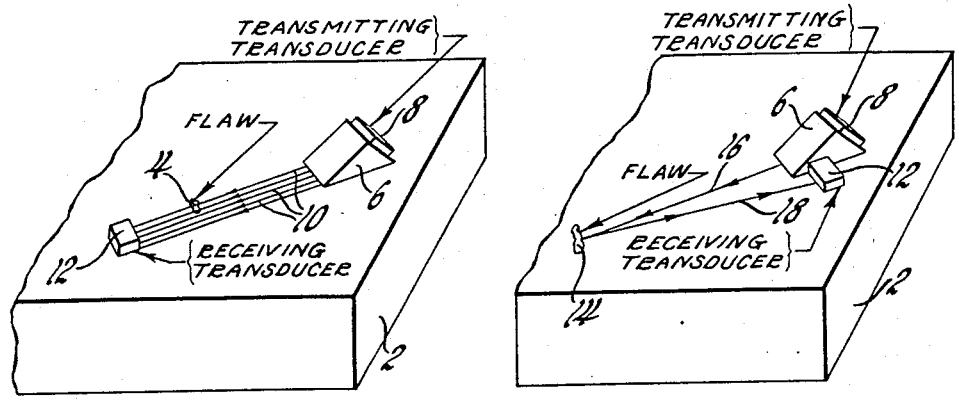
Figure 1 is a schematic diagram illustrating the theory of applying surface waves to a part for inspection.
Figure 2 is a schematic diagram similar to Fig. 1 showing a modified arrangement of inspection parts on the surface of a part under test.

Referring now more particularly to Figure 1, there is shown therein a part 2 which is under inspection for a flaw 4 in its upper surface. In order to apply oscillatory waves that will flow along the surface of the part, there is provided a wedge-shaped member 6 which is placed upon the upper surface to introduce the incident waves to the surface of the part at an angle approximately the critical angle for surface waves as determined by Snell's law. In explanation, when a crystal is applied with its surface flat against the face of the surface of a part to be tested and the crystal is X-cut, only longitudinal waves are induced into the part. These waves may be reflected by the opposite face or by any cracks or flaws in the part and therefore the part tested. If now an intermediate wedge-shaped member is inserted between the crystal and the part, which member has a small angle, then the driving of the crystal will create both a longitudinal and a shear wave in the part, which waves will not travel into the part at the same angle. The shear wave will be at a different angle than the longitudinal wave and the shear wave will trail the longitudinal wave direction as the angle of the intermediate wedge-shaped member increases. This is due to the fact that the longitudinal wave has a greater index of refraction. On further increasing the wedge angle, the critical angle for the longitudinal wave is reached and the longitudinal wave from this point on is totally reflected back into the intermediate member and does not penetrate into the part. Further increase of the wedge angle will approach the critical angle of the trailing shear wave beam. At a point slightly greater than the critical angle of the shear wave a strong surface wave is induced that is used for testing surface or slightly sub-surface conditions. When a crystal such as 8 supplied from an oscillator is applied to one face of the wedge-shaped member 6, and driven by an oscillating source of power, not shown, waves are projected from the wedge-shaped driving means 6 along the upper surface of part 2, as shown by the plurality of lines at 10. Any irregularity of the surface through which these surface waves flow alters the beam of radiation by reflection, scattering or absorption.

A receiving crystal 12 of the Y-cut surface wave type may be placed on the upper surface of the part 2 at a given distance from the transmitter and there is connected thereto some means for measuring the amount of radiation received (not shown). The two crystals maintained at a given spacing are moved about the surface of the part. If a normal amount of radiation is not received through some area of transmission of the surface waves, then the operator will know that there is a flaw in this area. For example, in the illustration shown in Figure 1, as the testing beam applied reaches the area of flaw 4, the energy received by the receiving crystal 12 will be reduced, indicating a flaw in this area.

It is not, of course, necessary that the transmitting beam be entirely in one direction and in Figure 2 there is illustrated an arrangement in which the receiving crystal may be placed adjacent to the transmitting one and the reflected beam measured. Again, on the upper surface of the part 2 being inspected, there is placed a wedge 6 and the transmitting crystal 8. In this instance the flaw 14 is shown at a different location and the receiving transducer 12 is placed adjacent the wedge 6. The surface waves are sent out along a path as indicated by the arrowed line 16, and if they encounter any irregularity in the surface such as flaw 14, they will be reflected back along a path such as 18 to the receiving transducer or crystal. In this arrangement the pulse-echo type of equipment is used where the time of travel of the waves indicates the distance to the flaw or boundary and not the absorption of the radiation. The application of the transmitting crystal 8 to the wedge to create surface waves in combination with the timed reception of waves on the Y-cut receiving transducer 12 produces a very satisfactory and sensitive inspection system. The pulse or wave in this instance is sent out by transmitting crystal 8 along the surface and reflected to receiving Y-cut crystal 12 to provide the indication. Thus Figures 1 and 2 illustrate the theory of the use of the introduction of surface waves into a part for inspection purposes either by direct transmission or reflection.

Figure 3:
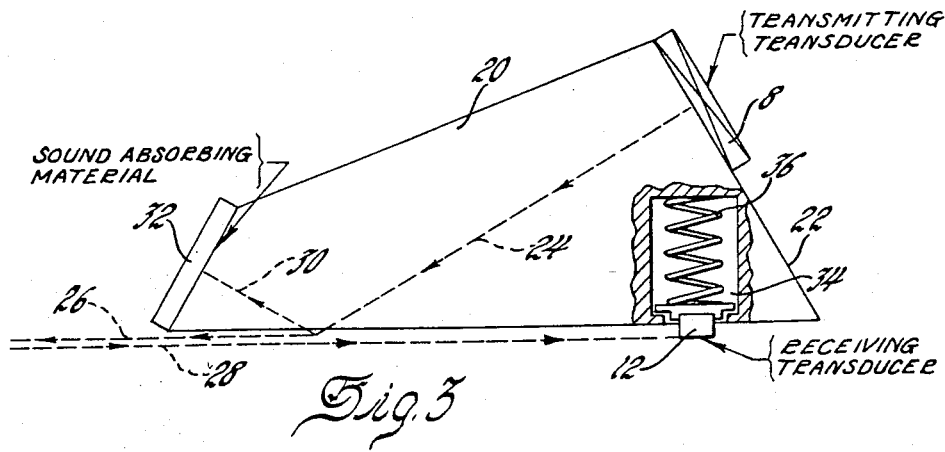
Figures 3 and 4 are schematic diagrams showing two different forms of vibration transmitting means incorporating my invention for utilizing surface waves for part inspection.

Figure 3 shows a composite vibration transmitting unit for transmitting and receiving surface waves for part inspection. In this instance an irregularly shaped member 20 is shown, to which may be applied the transmitting transducer 8 on the back slanted face 22. The beam of waves produced by the transducer 8 will follow the dotted arrow line 24. When it reaches the upper surface of the part to which the member 20 has been applied, a portion of the beam will be transmitted through said part as surface waves, as indicated by the further dotted arrow line 26. This beam will radiate out and inspect the surface of the part for flaws. If it encounters any flaws, a reflected beam will be produced as indicated by the dotted arrowed line 28. Also a portion of the beam 24 will be reflected from the interface between the member 20 and the part to be inspected, as shown by the dotted arrow line 30. A layer of sound absorbing material 32 is secured to the forward surface of the member 20 to absorb these reflected rays 30 and prevent them from interfering with a proper indication at the receiving transducer. The same result may be obtained by roughening the surface. Transducer 12 is located in a recess 34 in the bottom of the member 20 and is spring biased outwardly by a spring 36, so that it presses to a slight degree against the upper surface of the part to be inspected. This pressure is sufficient to cause the transducer 12 to satisfactorily pick up and translate the surface waves flowing along the path indicated by 28 which are transverse to the crystal. This composite body includes in one unit a means for producing and receiving high frequency waves produced in the surface of a part for the inspection along different paths as it is moved about on the surface of the part.

Figure 4:
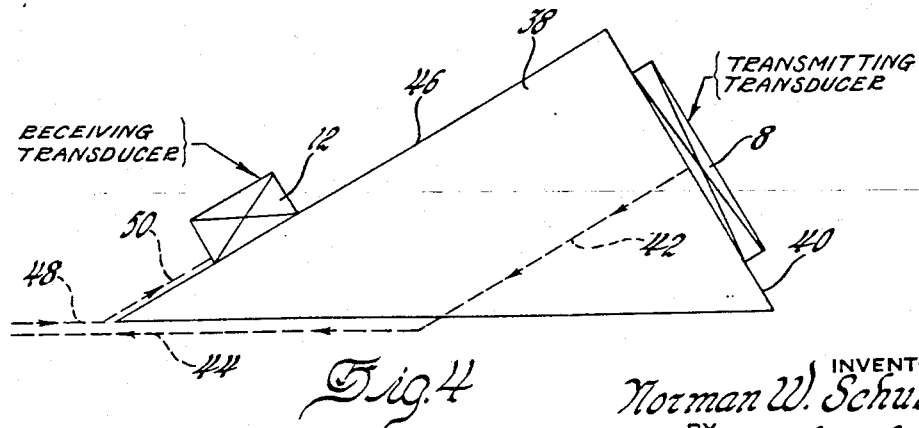

Referring lastly to Figure 4, this illustrates a composite inspection means which is similar to that shown in Figure 3. In this case a wedge-shaped member 38 is provided which is adapted to be applied to the surface of a part to be inspected. Again, the transmitting transducer 8 is applied to the back face 40 of the wedge-shaped member in order to produce a series of waves directed down at an angle to the surface of the part. Such a beam is indicated by the dotted arrowed line 42. This produces in the part a wave beam in the upper surface as indicated by the arrowed line 44. However, in this instance the receiving transducer 12 or Y-cut crystal is mounted on the upper surface 46 of the wedge-shaped member 38, and since the point of the wedge is relatively sharp, any returning or reflected beam such as indicated by the line 48 will create surface waves in the upper surface of the wedge face 46 following the deflected path as indicated at 50. This returning beam can be picked up by the receiving transducer in the same manner as the receiving transducer 12 in Figure 3, and will give an indication of the energy received along that path.

There is herein provided means which can be quickly applied to the surface of a part to inspect it accurately for surface irregularities and flaws in production.

I claim:

1. In testing apparatus for inspecting the surface of a part, means for producing high frequency mechanical waves, an angled member having a first surface for application to the surface of a part to be tested and a second surface to which the means for producing high frequency waves is applied, the angle between said first and second surfaces being such that the waves generated by the means for producing high frequency mechanical waves impinges on the surface of the part to be tested at substantially a critical angle for developing high frequency surface waves in said part which travel through the surface of the part and if these waves encounter a flaw or crack are reflected back toward the point of origin and Y-cut high frequency crystal transducer means mounted on the angled member engaging a surface in which reflected surface waves travel and sensitive to such surface waves to determine the continuity of the part.

2. In testing apparatus for inspecting a part for continuity, a transmitting electro-mechanical transducer for converting electrical high frequency waves into mechanical vibrations, a receiving mechanical-electrical transducer for converting transverse mechanical vibrations into high frequency electrical waves, a vibration transmitting member having a plurality of plane surfaces at angles to each other, a first surface being adapted to engage the surface of the part to be tested and at least two other surfaces for the application of the transmitting and receiving transducers respectively, a second surface of the vibration transmitting member to which the transmitting transducer is adapted to be applied being at such an angle to the first surface that the induced waves generated by the transmitting electro-mechanical transducer will impinge on the surface of the part being tested at substantially a critical angle so that mechanical surface waves are developed in the part and a third surface upon which the receiving transducer is adapted to be mounted being at such an angle to the first surface that reflected surface waves flowing in the surface of the part being tested will follow up this third surface, said generated surface waves being sent through the part being tested to be reflected by any flaw therein, said reflected waves following up said third surface to effect the receiving transducer and indicate said flaw.

3. In testing apparatus for use with high frequency electro-mechanical transducers to develop in and receive high frequency mechanical waves from a part to be tested, an applicator comprising a body having a first flat surface to be applied to the surface of the part under test, a first electro-mechanical transducer, a second surface of said applicator on which said first electro-mechanical transducer is mounted, said second surface being at such an angle to said first surface that the transducer may project a beam at substantially the critical angle to the surface of the part as determined by Snell's Law to generate surface waves in the part which travel therethrough and are reflected from cracks or flaws in the part, a third surface on said applicator also at an angle to the first, surface sound absorbing material affixed to the third surface to absorb any high frequency rays directed against the same, said applicator having a cavity extending inwardly from the first surface, a second electro-mechanical transducer, said second transducer being of the Y-cut crystal type and sensitive to transverse vibrations, mounting means for said second electro-mechanical transducer in said cavity, and biasing means tending to eject the mounting means and transducer from the cavity to press the second transducer against the part when in place so that it is sensitive to transverse surface waves reflected from flaws therein.

4. In testing apparatus for inspecting a part, a wedge-shaped vibration transmitting member having a plurality of plane surfaces at angles to each other, a first surface being adapted to be placed on the part to be tested, a second surface of the wedge-shaped vibration transmitting member at an angle to said first surface, a transmitting electro-mechanical crystal transducer mounted on said second surface, the angle between said first and second surfaces being such that the beam of high frequency waves generated by the transmitting electro-mechanical transducer impinges on the surface of the part at substantially the critical angle as determined by Snell's Law to generate surface waves in the part, said surface waves travelling through the part adjacent the surface and if they encounter any flaws or cracks are reflected therefrom, said wedge-shaped transmitting member having an aperture in said first face and a Y-cut crystal electro-mechanical receiving transducer resiliently mounted in said aperture and biased to move outwardly therefrom so that when the first surface is applied to the part to be tested the Y-cut crystal transducer is pressed firmly against the surface and sensitive to any surface waves reflected by flaws or cracks.

References Cited in the file of this patent

UNITED STATES PATENTS

| | | |
|---|---|---|
| 2,439,131 | Firestone | Apr. 6, 1948 |
| 2,460,153 | Smoluchowski | Jan. 25, 1949 |
| 2,505,867 | Meunier | May 2, 1950 |
| 2,784,325 | Halliday et al. | Mar. 5, 1957 |
| 2,787,160 | Van Valkenburg | Apr. 2, 1957 |

FOREIGN PATENTS

| | | |
|---|---|---|
| 476,330 | Canada | Aug. 21, 1951 |
| 714,564 | Great Britain | Sept. 1, 1954 |

OTHER REFERENCES

Article by Cook et al. in A.S.T.M. Bulletin, May 1954, pp. 81–84.